United States Patent
Higashimachi (10) Patent No.: US 10,000,180 B2
(45) Date of Patent: Jun. 19, 2018

(54) PEDESTRIAN PROTECTION AIRBAG DEVICE

(71) Applicant: TOYOTA JIDOSHA KABUSHIKI KAISHA, Toyota-shi, Aichi-ken (JP)

(72) Inventor: Naoya Higashimachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/017,870

(22) Filed: Feb. 8, 2016

(65) Prior Publication Data
US 2016/0229373 A1 Aug. 11, 2016

(30) Foreign Application Priority Data
Feb. 10, 2015 (JP) .................................. 2015-024549

(51) Int. Cl.
*B60R 21/36* (2011.01)
*B60R 21/00* (2006.01)

(52) U.S. Cl.
CPC ........ *B60R 21/36* (2013.01); *B60R 2021/003* (2013.01); *B60R 2021/0004* (2013.01)

(58) Field of Classification Search
CPC ............ B60R 21/36; B60R 2021/0004; B60R 2021/003
See application file for complete search history.

(56) References Cited

U.S. PATENT DOCUMENTS

| 6,705,636 | B2 | 3/2004 | Takahara |
| 6,923,286 | B2* | 8/2005 | Sato ..................... B60R 21/36 180/274 |
| 7,243,754 | B2 | 7/2007 | Mori et al. |
| 7,549,663 | B2* | 6/2009 | Takimoto ............... B60R 21/36 280/274 |
| 7,584,988 | B2 | 9/2009 | Okamoto et al. |
| 8,985,257 | B2* | 3/2015 | Tanaka .................. B60R 21/36 180/274 |

(Continued)

FOREIGN PATENT DOCUMENTS

| EP | 2520470 B1 | 5/2014 |
| EP | 2 796 327 A2 | 10/2014 |

(Continued)

*Primary Examiner* — Paul N Dickson
*Assistant Examiner* — Joselynn Y Sliteris
(74) *Attorney, Agent, or Firm* — Oliff PLC (57) ABSTRACT

A pedestrian protection airbag device includes an airbag case, a pair of inflators and an airbag. The airbag case is disposed at a lower face side of a hood rear end portion with a length direction thereof extending along a vehicle width direction. A vehicle width direction middle region of the airbag case, when viewed in a vertical cross-section extending in a vehicle front-and-rear direction, has a cross-sectional height in a vehicle up-and-down direction smaller than a cross-sectional height in the vehicle up-and-down direction of a general portion of the airbag case located at outer ends in the vehicle width direction of the middle region. The inflators are accommodated at both of vehicle width direction ends of the middle region. The airbag in the airbag case inflates from pressure of gas generated by the inflators, and deploys rearward through a gap between the hood rear end portion and a windshield.

14 Claims, 6 Drawing Sheets

(56) References Cited

U.S. PATENT DOCUMENTS

| | | | |
|---|---|---|---|
| 9,346,432 B2* | 5/2016 | Sugimoto | B60R 21/237 |
| 9,387,823 B2* | 7/2016 | Choi | B60R 21/36 |
| 2009/0000847 A1 | 1/2009 | Takimoto et al. | |
| 2014/0291054 A1* | 10/2014 | Tanaka | B60R 21/36 |
| | | | 180/274 |
| 2017/0008483 A1* | 1/2017 | Takase | B60R 21/215 |
| 2017/0008484 A1* | 1/2017 | Takase | B60R 21/36 |

FOREIGN PATENT DOCUMENTS

| | | |
|---|---|---|
| JP | H08-192769 A | 7/1996 |
| JP | 2002283945 A | 10/2002 |
| JP | 2003-089333 A | 3/2003 |
| JP | 2003-291756 A | 10/2003 |
| JP | 2004168111 A | 6/2004 |
| JP | 2005178587 A | 7/2005 |
| JP | 2006044291 A | 2/2006 |

\* cited by examiner

PEDESTRIAN PROTECTION AIRBAG DEVICE

CROSS-REFERENCE TO RELATED APPLICATION

This application is based on and claims priority under 35 USC 119 from Japanese Patent Application No. 2015-024549 filed on Feb. 10, 2015, the entire disclosure of which is incorporated by reference herein.

BACKGROUND

Technical Field

The present disclosure relates to a pedestrian protection airbag device.

Related Art

A pedestrian protection airbag device is known that inflates and expands an airbag from a lower face side of a rear end portion of a hood of a vehicle, such as an automobile or the like, to protect a pedestrian. Japanese Patent Application Laid-Open (JP-A) No. 2004-168111 discloses a structure that is this kind of pedestrian protection airbag device, in which an airbag case is arranged along the vehicle width direction at the lower face side of the hood rear end portion, and an airbag and an inflator are accommodated in the airbag case.

However, with a view to improving aesthetic design, in some vehicles the height of the hood is lowered and the wiper(s) is/are moved to below the hood. However, when the height of the hood is lowered, space between a power unit (engine, etc.) and the hood is reduced. In particular, a vehicle width direction middle region of the hood rear end portion is disposed above members such as an intake manifold and the like, which reduces the space between the power unit and the hood. In addition, the wiper is disposed rearward thereof. Consequently, it is difficult to assure sufficient space in which to dispose the airbag case.

SUMMARY

In consideration of the situation described above, an object of the present disclosure is to provide a pedestrian protection airbag device in which an airbag case may be disposed at the lower face side of a hood rear end portion even in a vehicle in which a space between the hood and a power unit is narrow.

A pedestrian protection airbag device according to a first aspect includes: an airbag case that is disposed at a lower face side of a hood rear end portion with a length direction of the airbag case extending along a vehicle width direction, a vehicle width direction middle region of the airbag case, when viewed in a vertical cross-section that extends in a vehicle front-and-rear direction, has a cross-sectional height in a vehicle up-and-down direction that is smaller than a cross-sectional height in the vehicle up-and-down direction of a general portion of the airbag case located at outer ends in the vehicle width direction of the middle region; a pair of inflators that are respectively accommodated at each of two vehicle width direction ends of the middle region of the airbag case; and an airbag that is folded and accommodated in the airbag case, the airbag inflating and expanding, due to pressure of gas generated by the inflators, to the vehicle rearward side through a gap between the hood rear end portion and a windshield glass.

In the pedestrian protection airbag device according to the first aspect, the airbag case is disposed at the lower face side of the hood rear end portion with the length direction thereof along the vehicle width direction, and the pair of inflators are accommodated in the airbag case. The airbag is folded up and also accommodated in the airbag ease. The airbag is inflated and expanded, by the pressure of the gas generated by the inflators, through the gap between the hood rear end portion and the windshield glass. Thus, at a time of collision with a pedestrian, the pedestrian may be protected by the inflator operating and the airbag being inflated and expanded.

The pair of inflators are respectively disposed at each of the two vehicle width direction ends relative to the vehicle width direction middle region of the airbag case. The middle region is formed such that the cross-sectional height, in the vehicle up-and-down direction, is smaller than the cross-sectional height of the general portion. Therefore, even in a vehicle in which a space between a power unit and the hood rear end portion is narrow, the airbag case may be disposed at the lower face side of the hood rear end portion.

In a pedestrian protection airbag device according to a second aspect, the middle region of the airbag case of the first aspect has a length in the vehicle front-and-rear direction that is shorter than a length in the vehicle front-and-rear direction of the general portion.

In the pedestrian protection airbag device according to the second aspect, a wiper may be moved further to the vehicle forward side without the wiper and the airbag case interfering with one another.

In a pedestrian protection airbag device according to a third aspect, the airbag case of the first or second aspects is disposed outside a power unit compartment of the vehicle in which the airbag case is disposed.

In the pedestrian protection airbag device according to the third aspect, effects of heat from the power unit on the airbag case may be suppressed.

In a pedestrian protection airbag device according to a fourth aspect, the airbag case of the third aspect is disposed at a vehicle upper side of a cowl louver of the vehicle, with a gap formed between the airbag case and the cowl louver.

In the pedestrian protection airbag device according to the fourth aspect, because the case is disposed with a gap between the case and the cowl louver, direct transmission of vibrations from the power unit to the airbag case may be suppressed.

In a pedestrian protection airbag device according to a fifth aspect, the pair of inflators in any one of the first to fourth aspects are joined to each other by a joining bracket disposed at the middle region of the airbag case, and the pair of inflators are mounted to the hood rear end portion via the joining bracket.

In the pedestrian protection airbag device according to the fifth aspect, the pair of inflators may together be mounted to the hood rear end portion by the joining bracket.

In a pedestrian protection airbag device according to a sixth aspect, the inflators of the fifth aspect extend in the vehicle width direction and are provided with gas jetting-out portions (outlets) at vehicle width direction outer side end portions of the inflators, and the pair of inflators are arranged in a straight line in the vehicle width direction in plan view.

In the pedestrian protection airbag device according to the sixth aspect, when the gas is jetted out from the gas jetting-out portions (outlets) of the pair of inflators, respective reaction forces toward the vehicle width direction inner sides act on the inflators. However, because the pair of inflators are arranged in a straight line in the vehicle width direction in plan view and are joined to each other by the joining bracket, the reaction forces during jetting out of the gas may be negated.

As described hereabove, according to the first aspect, an excellent effect is provided in that the airbag case may be disposed at the lower face side of the hood rear end portion even in a vehicle in which the space between the hood and the power unit is narrow.

According to the second aspect, an excellent effect is provided in that the wiper may be relocated further forward in the vehicle and aesthetic design may be improved.

According to the third aspect, an excellent effect is provided in that a rise in temperature of the airbag case due to heat produced from the power unit may be suppressed.

According to the fourth aspect, an excellent effect is provided in that a mounting state of the airbag case may be excellently maintained.

According to the fifth aspect, excellent effects are provided in that, compared to a structure in which a pair of inflators are mounted at a hood rear end portion via respectively separate brackets, a number of components may be reduced and required space may be reduced.

According to the sixth aspect, an excellent effect is provided in that a mounting state of the inflators may be excellently maintained even when the gas is jetted out from the pair of inflators.

BRIEF DESCRIPTION OF THE DRAWINGS

Exemplary embodiments will be described in detail based on the following figures, wherein.

DETAILED DESCRIPTION

—First Exemplary Embodiment—

Herebelow, a first exemplary embodiment of a pedestrian protection airbag device is described using FIG. 1 to FIG. 4. An arrow FR that is shown as appropriate in the drawings indicates a vehicle forward side, an arrow UP indicates a vehicle upper side, and an arrow LH indicates a vehicle left side of a vehicle width direction. In the following descriptions, where the directions front, rear, up, down, left and right are used without being particularly specified, the same represent the front and rear in the vehicle body front-and-rear direction, up and down in the vehicle body up-and-down direction; and left and right if facing in the running direction.

Figure 4:
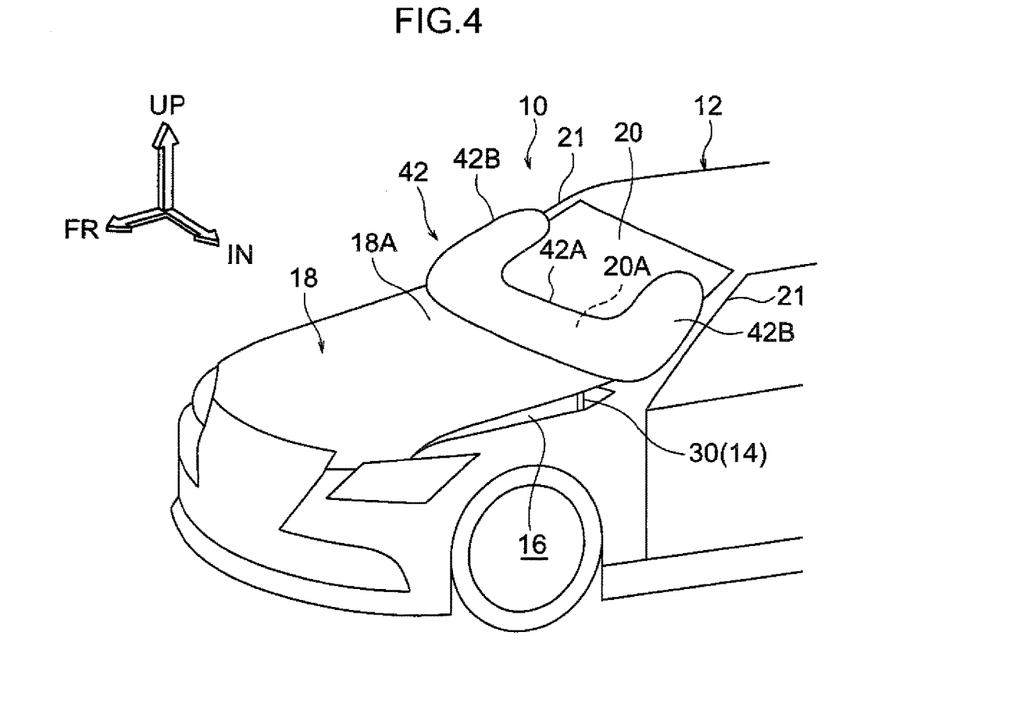
FIG. 4 is a perspective view showing a front portion of a vehicle in which the pedestrian protection airbag device in accordance with the first exemplary embodiment is installed, which is a diagram showing an operated state in which the airbag has been inflated and expanded.

As shown in FIG. 4, a vehicle 12 is equipped with a pedestrian protection airbag device 10 according to the present exemplary embodiment (hereinafter referred to as "the airbag device 10" where appropriate). A hood 18 is provided above an engine compartment (a power unit compartment) 16 of the vehicle 12. A windshield glass 20 is disposed at the vehicle rear side of the hood 18. The windshield glass 20 is angled diagonally upward toward the vehicle rear side. A lower portion 20A of the windshield glass 20 opposes a rear end portion 18A of the hood 18 from the vehicle rear side thereof.

A front end portion of the hood 18 is ordinarily kept in a locked state by a hood lock, which is not shown in the drawings. A hood hinge, which is not shown in the drawings, is disposed at each of two vehicle width direction sides of the rear end portion 18A of the hood 18. Each hood hinge includes a hinge base that is fixed to the vehicle body, and a hinge arm of which one end portion is fixed to the hood and an other end portion is joined by a pin to the hinge base, making the hinge arm swingable about this joining point. A pop-up device 14 is disposed at each of the two vehicle width direction sides of the rear end portion 18A of the hood 18. The pop-up device 14 lifts up a rod 30 and raises the rear end portion 18A of the hood 18 at a time of collision with a pedestrian. In FIG. 4, a structure is employed in which the rod 30 is lifted up by a gas generator operating to raise the rear end portion 18A of the hood 18. However, this is not limiting and an alternative structure may be employed. For example, the rear end portion 18A of the hood 18 may be popped up by a link mechanism.

Figure 2:
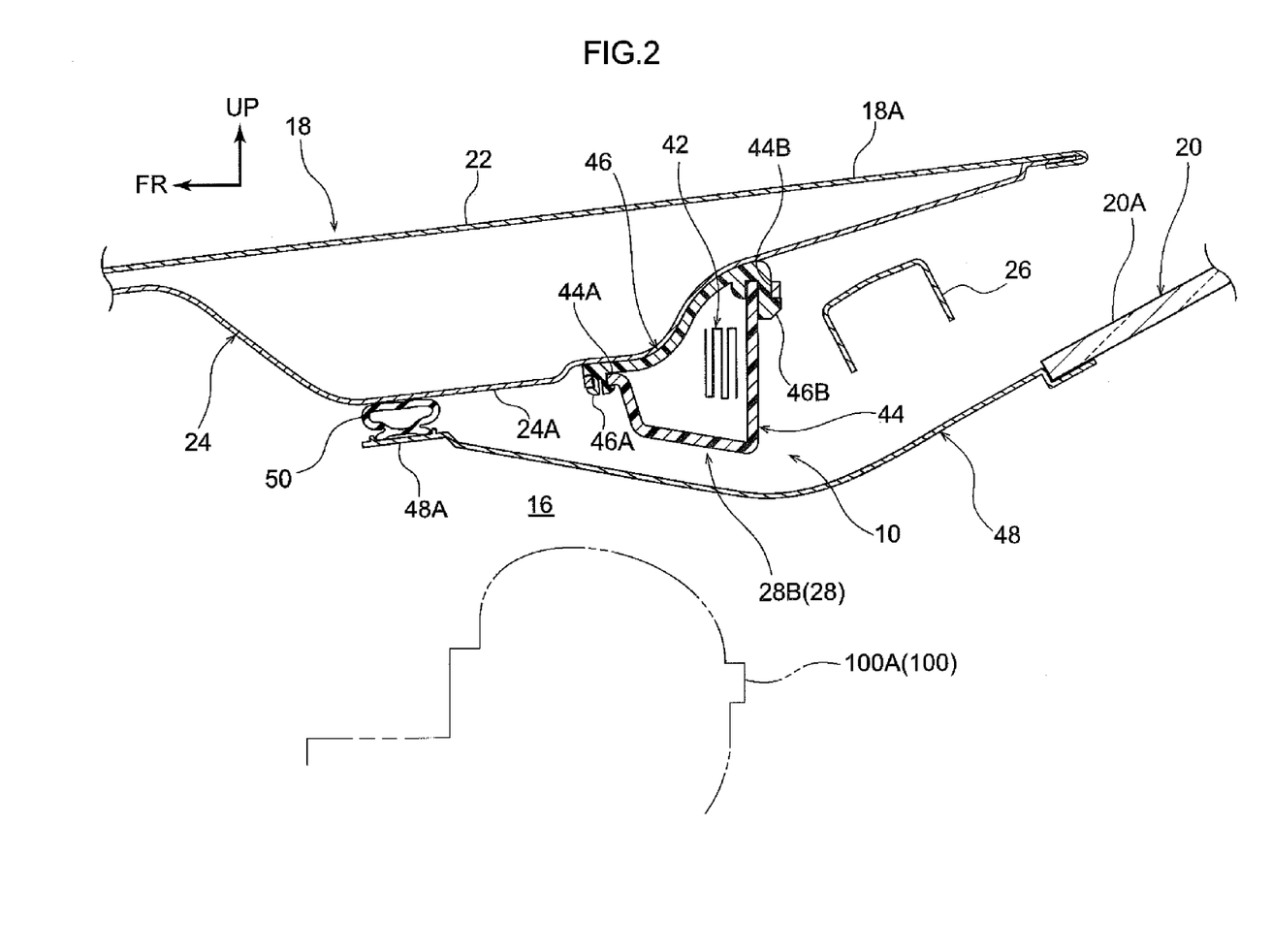
FIG. 2 is a magnified sectional diagram showing a magnification of a sectional view cut along line 2-2 in FIG. 1.

As shown in FIG. 2, the hood 18 includes a hood outer panel 22 and a hood inner panel 24. The hood outer panel 22 is disposed at the vehicle outer side of the hood 18 and forms a design surface of the hood 18. The hood inner panel 24 is disposed at the side of the hood 18 at which the engine compartment 16 is disposed and reinforces the hood outer panel 22. A bulge portion 24A is formed at the hood inner panel. The bulge portion 24A bulges to the vehicle lower side thereof and extends along the vehicle width direction. The bulge portion 24A is formed at a position that is offset to the vehicle forward side from the rear end portion 18A of the hood 18.

A wiper arm 26 is disposed below the rear end portion 18A of the hood 18. A proximal end side of the wiper arm 26 is mounted at a pivot rod, which is not shown in the drawings. A wiper blade, which is not shown in the drawings, is attached to a distal end side of the wiper arm 26. The airbag device 10 is disposed in a space at the vehicle rearward side of the bulge portion 24A of the hood inner panel 24, at the vehicle forward side relative to the wiper arm 26.

—Overall Structure of the Pedestrian Protection Airbag Device—

Figure 1:
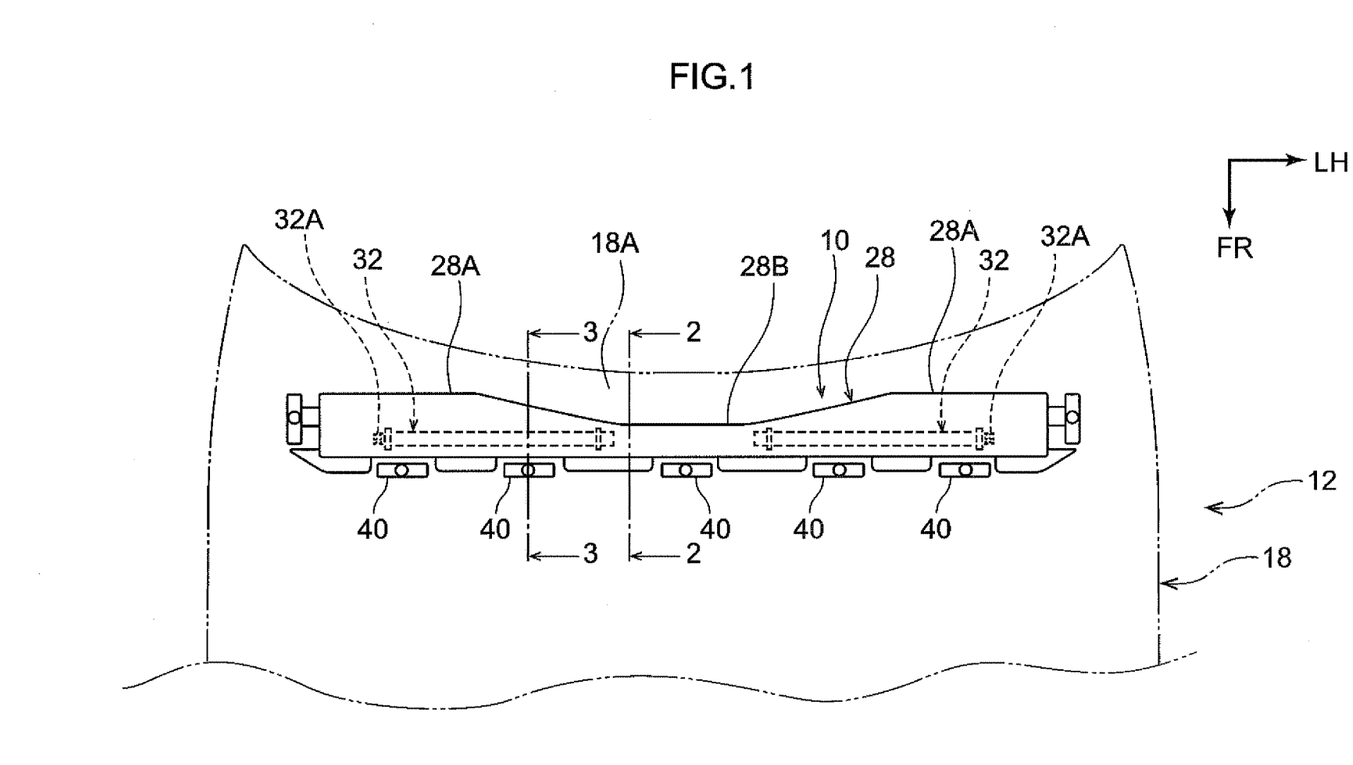
FIG. 1 is a plan view showing principal portions of a pedestrian protection airbag device in accordance with a first exemplary embodiment, which is a diagram showing a non-operated state in which an airbag is accommodated.

As shown in FIG. 1, the airbag device 10 is provided with an airbag case 28. A pair of inflators 32 are accommodated in the airbag case 28. The pair of inflators 32 are accommodated at two vehicle width direction end portions of the airbag case 28. The inflators 32 are disposed at a front end portion of the interior of the airbag case 28 with respective length directions of the inflators 32 extending along the vehicle width direction.

Figure 3:
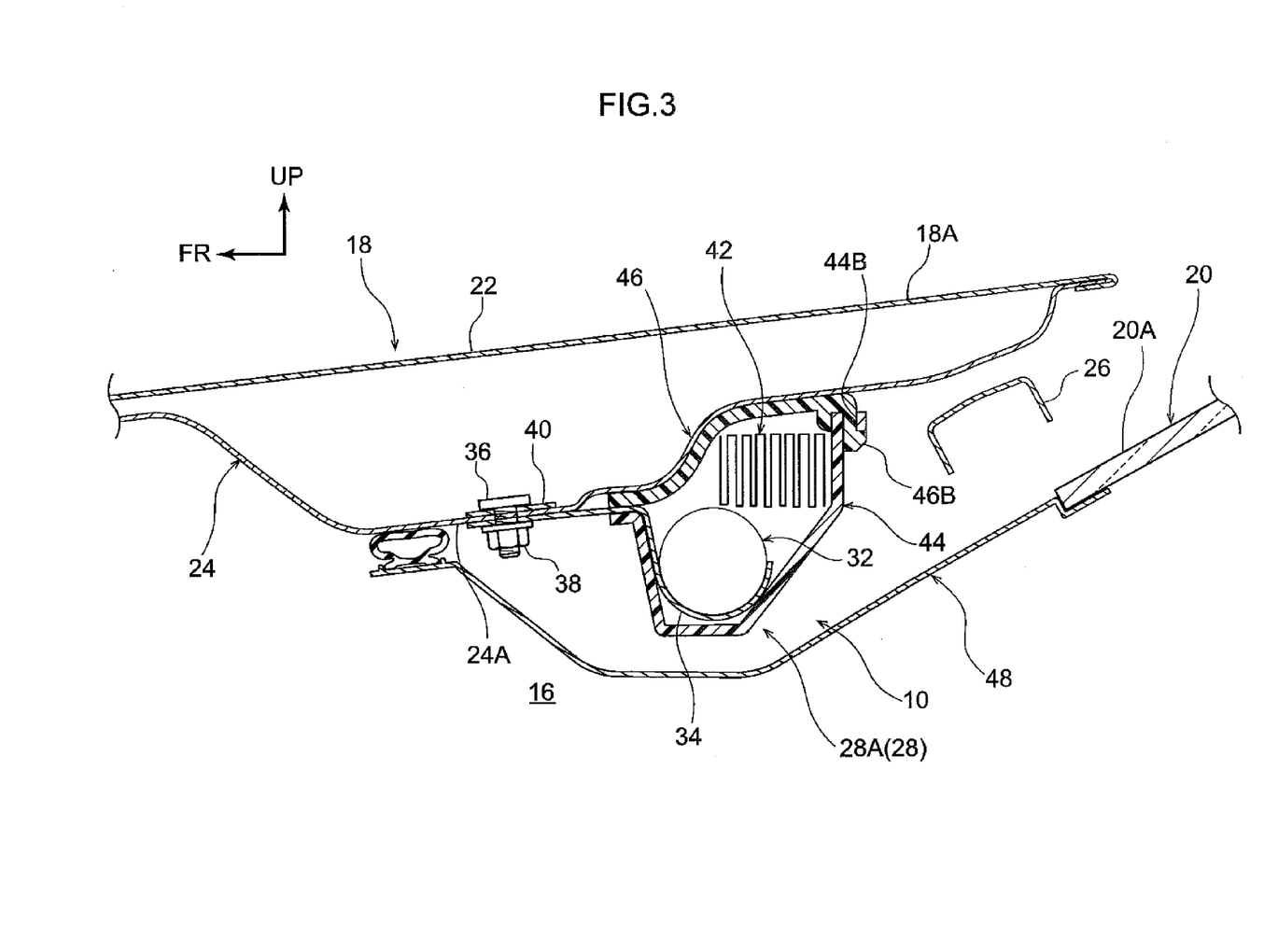
FIG. 3 is a magnified sectional diagram showing a magnification of a sectional view cut along line 3-3 in FIG. 1.

As the inflators 32 according to the present exemplary embodiment, for example, "cylinder-type" inflators are employed. In a plan view, the inflators 32 are arranged in a substantially straight line with a gap therebetween in the vehicle width direction. As shown in FIG. 3, the pair of inflators 32 are each joined to mounting brackets 34, which are formed of plate members made of metal. The mounting brackets 34 are disposed so as to support the inflators 32 from the vehicle lower side thereof. The mounting brackets 34 extend to the lower face side of the bulge portion 24A. The mounting brackets 34 are fixed by fastening to the bulge portion 24A by bolts 36 and weld nuts 38. Specifically, the bolts 36 are inserted from the upper face side of the hood inner panel 24, sandwiching spacer members 40, are screwed into the bolts 36 provided at the mounting brackets 34, and thus are fixed by fastening to the weld nuts 38.

As shown in FIG. 1, each of the pair of inflators 32 is provided with a gas jetting-out portion (outlet) 32A at a respective vehicle width direction outer side end portion thereof. Plural gas jetting-out holes are formed in a periphery wall portion of the gas jetting-out portion 32A. A squib (an ignition device), which is not shown in the drawings, is disposed at an axial central portion at the vehicle width direction inner side of the inflator 32. A gas generating agent that generates large quantities of gas when combusted is charged into the interior of the inflator 32.

In addition, a coolant for cooling the high-temperature gas that is generated, a filter for removing debris that is produced when the gas generating agent combusts, and the like are accommodated in the inflator 32. The inflators 32 of the present exemplary embodiment are inflators of a type that uses a gas generating agent, but may be inflators of a type in which high-pressure gas is sealed.

The inflators 32 are connected to a controller (an airbag ECU), which is not shown in the drawings, disposed at a central portion of the floor of the vehicle body. The controller is connected to a collision detection sensor (not shown in the drawings) or a collision prediction sensor (not shown in the drawings). The collision detection sensor or collision prediction sensor is disposed at a front bumper, which is not shown in the drawings, that is disposed at a front end portion of the vehicle 12 with a length direction thereof along the vehicle width direction. Sensors that may be employed as a collision detection sensor include, for example, a chamber-type sensor in which a long, narrow pressure tube or a pressure chamber and a pressure sensor are arranged along the front bumper at a front face side of a front bumper reinforcement, an optical fiber-type sensor, and the like. Sensors that may be employed as a collision prediction sensor include, for example, a pre-crash sensor that uses millimeter-wave radar, a stereo camera or the like to predict a collision with a collision body such as a pedestrian or the like, and the like.

As shown in FIG. 2 and FIG. 3, an airbag 42 is accommodated in the airbag case 28. The airbag 42 is, for example, structured in a bag shape by outer periphery portions of two base cloths that have been sewn together, and is stowed in the airbag case 28 in a folded state in accordance with a predetermined folding method such as bellows folding, roll folding or the like.

The airbag 42 is structured so as to be inflated and expanded, by the pressure of the gas generated by the inflators 32, toward the vehicle rearward side through a gap between the rear end portion 18A of the hood 18 and the windshield glass 20.

As shown in FIG. 4, the airbag 42 is provided with a central bag portion 42A and sideward bag portions 42B. The central bag portion 42A is disposed at a central portion in the vehicle width direction in the state in which the airbag 42 has inflated and expanded (the inflated and expanded state). The sideward bag portions 42B extend to the vehicle rear side and the vehicle upper side from two vehicle width direction end portions of the central bag portion 42A.

Therefore, at a time of collision with a pedestrian, the front face of the lower portion 20A of the windshield glass 20 is covered by the inflated and expanded central bag portion 42A, and front faces of at least lower portions of a pair of left and right front pillars 21 are covered by the sideward bag portions 42B.

—Structure of Airbag Case—

Now, the airbag case 28 according to the present exemplary embodiment is described. As shown in FIG. 1, the airbag case 28 is disposed at the lower face of the rear end portion 18A of the hood 18 and is formed in a long, narrow substantial box shape whose length direction is along the vehicle width direction. In the present exemplary embodiment, as an example, the airbag case 28 is formed of a resin material such as a fiber-reinforced plastic (FRP) or the like. However, this is not limiting and the airbag case 28 may be formed of a material other than a resin. For example, the airbag case 28 may be formed of a metal.

As shown in FIG. 2, the airbag case 28 includes a case upper 46 and a case lower 44. The case upper 46 is arranged along the lower face of the hood inner panel 24. The case lower 44 is disposed below the case upper 46 and structures a closed cross section (a chamber) together with the case upper 46.

The case upper 46 is arranged to extend along the rear end portion 18A of the hood 18 and the bulge portion 24A. Front side engaging portions 46A are provided protruding to the vehicle lower side at a front end portion of the case upper 46. Rear side engaging portions 46B are provided protruding to the vehicle lower side at a rear end portion of the case upper 46.

Correspondingly, the case lower 44 is formed in a substantial "U" shape in cross section, of which the two end sides in the vehicle front-and-rear direction extend up and down. Front side engaging holes 44A are formed at a front end portion of the case lower 44, at positions that correspond with the front side engaging portions 46A. Rear side engaging holes 44B are formed at a rear end portion of the case lower 44, at positions that correspond with the rear side engaging portions 46B. The front side engaging portions 46A of the case upper 46 are inserted into the front side engaging holes 44A of the case lower 44, and the rear side engaging portions 46B of the case upper 46 are inserted into the rear side engaging holes 44B of the case lower 44. Thus, the case upper 46 and the case lower 44 are engaged to structure the airbag case 28.

The front side engaging portions 46A and the rear side engaging portions 46B are plurally formed, spaced in the vehicle width direction. Therefore, the ease upper 46 and case lower 44 are engaged with each other at plural locations. In this structure, when gas is produced from the inflators 32, the airbag 42 inflates and the engaged state between the rear side engaging portions 46B of the case upper 46 and the rear side engaging holes 44B of the case lower 44 is disengaged by the inflation pressure. Hence, the airbag 42 inflates and expands to the vehicle rearward side through the gap between the rear end portion 18A of the hood 18 and the windshield glass 20.

The airbag case 28 is disposed at the vehicle upper side relative to a cowl louver 48, with a gap formed therebetween. Specifically, the cowl louver 48 is disposed at the lower end portion of the windshield glass 20 with weatherstripping, which is not shown in the drawings, interposed therebetween, and the cowl louver 48 extends in the vehicle width direction. A front end portion 48A of the cowl louver 48 extends to the vehicle forward side relative to the airbag case 28. The front end portion 48A is pressed against the bulge portion 24A of the hood 18 with weatherstripping 50 interposed therebetween. Consequently, the airbag case 28 is disposed with a gap formed between the airbag case 28 and the cowl louver 48. Further, the engine compartment 16 and the airbag case 28 are partitioned from one another by the cowl louver 48. Thus, the airbag case 28 is disposed outside the engine compartment 16.

Herein, a vehicle width direction middle region 28B of the airbag case 28 is formed to be smaller, in a vertical cross section extending along the vehicle front-and-rear direction (the cross section of the airbag case 28 illustrated in FIG. 2), than a cross section of general portions 28A that are at the vehicle width direction outer sides relative to the middle region 28B (the cross section of the airbag case 28 illustrated in FIG. 3).

Specifically, as shown in FIG. 1, the rear face of the airbag case 28 is formed in a shape that gradually shifts to the vehicle forward side from each of the general portions 28A toward the middle region 28B. In other words, the rear face of the middle region 28B of the airbag case 28 is formed to be recessed to the vehicle forward side in plan view relative to the general portions 28A. Therefore, the airbag case 28 is formed such that a length of the middle region 28B of the airbag case 28 in the vehicle front-and-rear direction, in the vertical cross section extending along the vehicle front-and-rear direction, is shorter than a length of the general portions 28A along the vehicle front-and-rear direction in the vertical cross section.

As shown in FIG. 2, the inflators 32 are not disposed in the middle region 28B of the airbag case 28. Therefore, as shown in FIG. 3, a cross-sectional height of the middle region 28B can be formed to be lower (smaller) than cross-sectional heights at the two vehicle width direction sides thereof. Thus, the middle region 28B of the airbag case 28 is formed to be smaller in height in the vehicle up-and-down direction in the vertical cross section extending along the vehicle front-and-rear direction than the height in the up-and-down direction in the vertical cross section of the general portions 28A. As can be appreciated from FIGS. 2 and 3, the vertical cross-section extending in the vehicle front-and-rear direction of the middle region 28B has smaller dimensions than the vertical cross-section extending in the vehicle front-and-rear direction of the general portions 28A in both the vehicle front-and-rear direction (length dimension) and in the vehicle up-and-down direction (height dimension).

—Operation and Effects—

Now, operation and effects of the present exemplary embodiment are described.

In the state before the vehicle 12 collides with a pedestrian, the pop-up device 14 and the airbag device 10 maintain a non-operated state. That is, the rear end portion 18A of the hood 18 is not raised to the vehicle upper side and the airbag 42 is accommodated inside the airbag case 28 in the folded state.

From this state, when there is a collision with a pedestrian, the collision detection sensor provided at the front bumper reinforcement, which is not shown in the drawings, detects the collision with the pedestrian. Similarly, a collision with a pedestrian may be predicted using a pre-crash sensor, a stereo camera or the like. Accordingly, the pop-up device 14 is operated by the controller, which is not shown in the drawings, and the rear end portion 18A of the hood 18 is raised (i.e., is popped up) to the vehicle upper side to a predetermined height (see FIG. 4).

When the level of raising of the rear end portion 18A of the hood 18 reaches a predetermined level, the inflators 32 of the airbag device 10 are operated by the controller that is not shown in the drawings. Hence, gas is jetted out from the gas jetting-out portions 32A of the inflators 32 and is supplied into the airbag 42. As a result, the airbag 42 starts to inflate inside the airbag case 28, and tension loads applied to the engaging portions of the case upper 46 and case lower 44 increase. When the tension loads reach predetermined values, the engaging state of the rear side engaging portions 46B of the case upper 46 with the rear side engaging holes 44B of the case lower 44 is disengaged and the airbag case 28 opens up and down into a rear-opening state.

Hence, as shown in FIG. 4, the airbag 42 inflates and expands to the vehicle rearward side through the gap between the rear end portion 18A of the hood 18 and the lower portion 20A of the windshield glass 20. In the inflated and expanded state, the front face of the lower portion 20A of the windshield glass 20 is covered by the central bag portion 42A, the front faces of at least the lower portions of the front pillars 21 are covered by the pair of left and right sideward bag portions 42B, and the pedestrian may be protected.

Now, in the vehicle 12 according to the present exemplary embodiment, as shown in FIG. 2 and FIG. 3, the wiper arm 26 is disposed to be hidden at the lower face side of the hood 18. Thus, the aesthetic design of the vehicle front portion is improved. Further, because the height of the hood 18 is lowered with a view to improving aesthetic design, the space between the hood 18 and an engine 100 is reduced. In particular, in the present exemplary embodiment as shown in FIG. 2, an intake manifold 100A is disposed below the vehicle width direction middle region of the rear end portion 18A of the hood 18. Therefore, space in which to dispose the airbag case 28 is reduced.

In the present exemplary embodiment, the cross-sectional height (dimension in the vehicle up-and-down direction) of the vehicle width direction middle region 28B of the airbag case 28 is formed to be lower (smaller) than the cross-sectional height of the general portions 28A. Therefore, even though the space between the hood 18 and the intake manifold 100A is narrow, the airbag case 28 may be disposed at the lower face of the rear end portion 18A of the hood 18. In the present exemplary embodiment, because the inflators 32 are disposed at the two vehicle width direction sides relative to the middle region 28B of the airbag case 28, the cross section of the middle region 28B may be specified without concern about space for accommodation of the inflators 32. Thus, the airbag case 28 may be disposed at the lower face of the rear end portion 18A of the hood 18 even though the space between the engine 100 and the hood 18 is narrow.

In the present exemplary embodiment, the cross section of the middle region 28B of the airbag case 28 is formed with a length in the vehicle front-and-rear direction that is shorter than the length in the vehicle front-and-rear direction of the cross section of the general portions 28A. Therefore, the wiper arm 26 may be moved further to the vehicle forward side without the wiper arm 26 (the wiper) and the airbag case interfering with one another. Hence, aesthetic design may be improved.

In the present exemplary embodiment, as shown in FIG. 2 and FIG. 3, the engine compartment 16 and the airbag case 28 are divided (separated) from one another by the cowl louver 48, and the airbag case 28 is disposed outside the engine compartment 16. Therefore, even when the engine 100 reaches a high temperature, effects of heat from the engine 100 on the airbag case 28 and a rise in temperature of the airbag case 28 are suppressed. Thus, even if the airbag case 28 is formed of a resin material in order to reduce weight, deformation of the airbag case 28 due to the effects of heat may be suppressed.

Furthermore, the airbag case 28 according to the present exemplary embodiment is not supported from the vehicle lower side thereof by the cowl louver 48, but a gap is provided between the cowl louver 48 and the airbag case 28. Therefore, the direct transmission of vibrations of the engine 100 through the cowl louver 48 to the airbag case 28 may be suppressed. Hence, mounting portions between the airbag case 28 and the hood 18 are not loosened and the mounting state of the airbag case 28 may be excellently maintained.

In the present exemplary embodiment, as shown in FIG. 1, the pair of inflators 32 are arranged in a substantially straight line with a gap formed therebetween in the vehicle width direction in plan view. However, the present disclosure is not limited to this structure. For example, the inflators 32 may be disposed such that the central axis of one inflator 32 crosses the central axis of the other inflator 32.

—Second Exemplary Embodiment—

Now, a second exemplary embodiment of the pedestrian protection airbag device is described with reference to FIG. 5. A pedestrian protection airbag device 60 according to the present exemplary embodiment (hereinafter referred to where appropriate as "the airbag device 60") has the same structure as in the first exemplary embodiment described above, except that a joining bracket 61 that joins the inflators 32 to each other is provided. Accordingly, only components around the joining bracket 61 are shown in the drawing and described. Structures that are the same as in the first exemplary embodiment are assigned the same reference numerals and are not described here.

Figure 5:
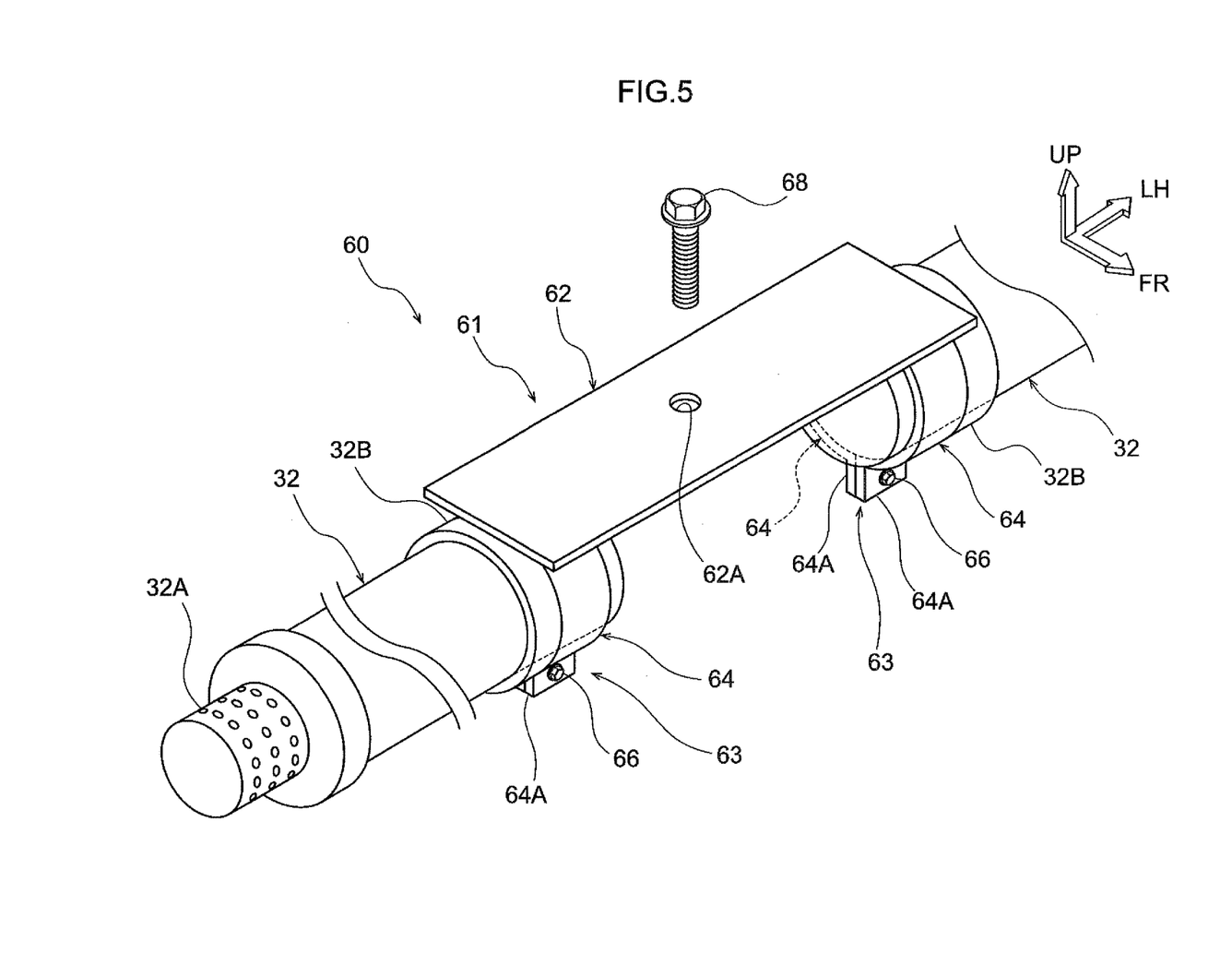
FIG. 5 is a perspective view showing a joining bracket that structures a pedestrian protection airbag device in accordance with a second exemplary embodiment.

As shown in FIG. 5, in the airbag device 60 according to the present exemplary embodiment, the pair of inflators 32 are accommodated in an airbag case, which is not shown in the drawings. Each of the pair of inflators 32 extends in the vehicle width direction and is provided with the gas jetting-out portion 32A at the vehicle width direction outer side. Similarly to the first exemplary embodiment, the pair of inflators 32 are arranged substantially in a straight line in the vehicle width direction in plan view (see FIG. 1).

The joining bracket 61 is disposed between the pair of inflators 32. The joining bracket 61 is accommodated in the vehicle width direction middle region of the airbag case that is not shown in the drawings. In plan view, the joining bracket 61 is formed in a substantially rectangular shape whose length direction is along the vehicle width direction.

The joining bracket 61 is structured with a flat plate-shaped main body portion 62 and a pair of restraining portions 63, which are provided at two vehicle width direction end portions of the main body portion 62. The main body portion 62 is arranged with a plate thickness direction thereof along the vehicle up-and-down direction. An insertion hole 62A into which a bolt 68 is to be inserted is formed in a central portion of the main body portion 62. The bolt 68 is inserted into the insertion hole 62A and screwed into a nut, which is not shown in the drawings, from the lower side of the main body portion 62. Thus, the main body portion 62 is a structure that may be joined to the hood inner panel at the rear end portion of the hood.

The pair of restraining portions 63 are formed in substantially annular shapes and structured so as to restrain vehicle width direction inner side end portions of the respective inflators 32. Each of the restraining portions 63 is structured by two opposing circular arc-shaped members 64 and arranged such that flange portions 64A formed at lower end portions of the circular arc-shaped members 64 are superposed with each other. In a state in which the inflator 32 is sandwiched between the two circular arc-shaped members 64, the flange portions 64A are fastened together by a bolt 66 and a nut that is not shown in the drawings. Hence, the inflator 32 is restrained. An alternative structure may be employed provided that structure may restrain the vehicle width direction inner side end portion of each inflator 32.

An annular projection portion 32B is formed at each inflator 32 according to the present exemplary embodiment. The inflator 32 is restrained such that the annular projection portion 32B is disposed at the vehicle width direction outer side of the restraining portion 63. Thus, a structure is formed such that reaction forces to the vehicle width direction inner sides, which act on the inflators 32 when the gas is jetted out through the gas jetting-out portions 32A of the inflators 32, are transmitted to the joining bracket 61.

In this manner, the pair of inflators 32 are joined in the vehicle width direction by the joining bracket 61 and mounted to the rear end portion of the hood via the joining bracket —Operation and Effects—

According to the airbag device 60 of the present exemplary embodiment, the joining bracket 61 is disposed between the pair of inflators 32 and the inflators 32 are mounted to the rear end portion of the hood via the joining bracket 61. Therefore, the mounting structure between the inflators 32 and the hood may be made more compact than a structure in which the pair of inflators 32 are respectively separately joined to brackets and mounted to the rear end portion of the hood. That is, a number of components may be reduced and required space may be reduced.

Further, even if it is difficult to assure sufficient space in which to dispose brackets of the inflators 32 in the vehicle front-and-rear direction, the inflators 32 may be mounted at the rear end portion of the hood by employing the joining bracket 61.

Because the pair of inflators 32 are arranged in a substantially straight line in the vehicle width direction, when the gas is jetted out from the gas jetting-out portions 32A of the inflators 32, opposing reaction forces act on the joining bracket 61 through the respective annular projection portions 32B. Therefore, the reaction forces acting on the inflators 32 may be negated and the mounting states of the inflators 32 may be excellently maintained.

In the present exemplary embodiment, the annular projection portions 32B are provided at the inflators 32. However this is not limiting and alternative structures may be employed. For example, a structure may be employed in which a taper portion whose diameter gradually reduces toward the vehicle width direction inner side is formed at the vehicle width direction inner side end portion of each inflator 32. Further, if restraining forces on the inflators 32 from the joining bracket 61 are sufficiently high, engaging structures such as the annular projection portions 32B or the like need not be provided. The same applies to the third exemplary embodiment described below.

—Third Exemplary Embodiment—

Now, a third exemplary embodiment of the pedestrian protection airbag device is described with reference to FIG. 6. A pedestrian protection airbag device 70 according to the present exemplary embodiment (hereinafter referred to where appropriate as "the airbag device 70") has the same structure as in the second exemplary embodiment described above, except that the shape of a joining bracket is different. Structures that are the same as in the first exemplary embodiment and the second exemplary embodiment are assigned the same reference numerals and are not described here.

Figure 6:
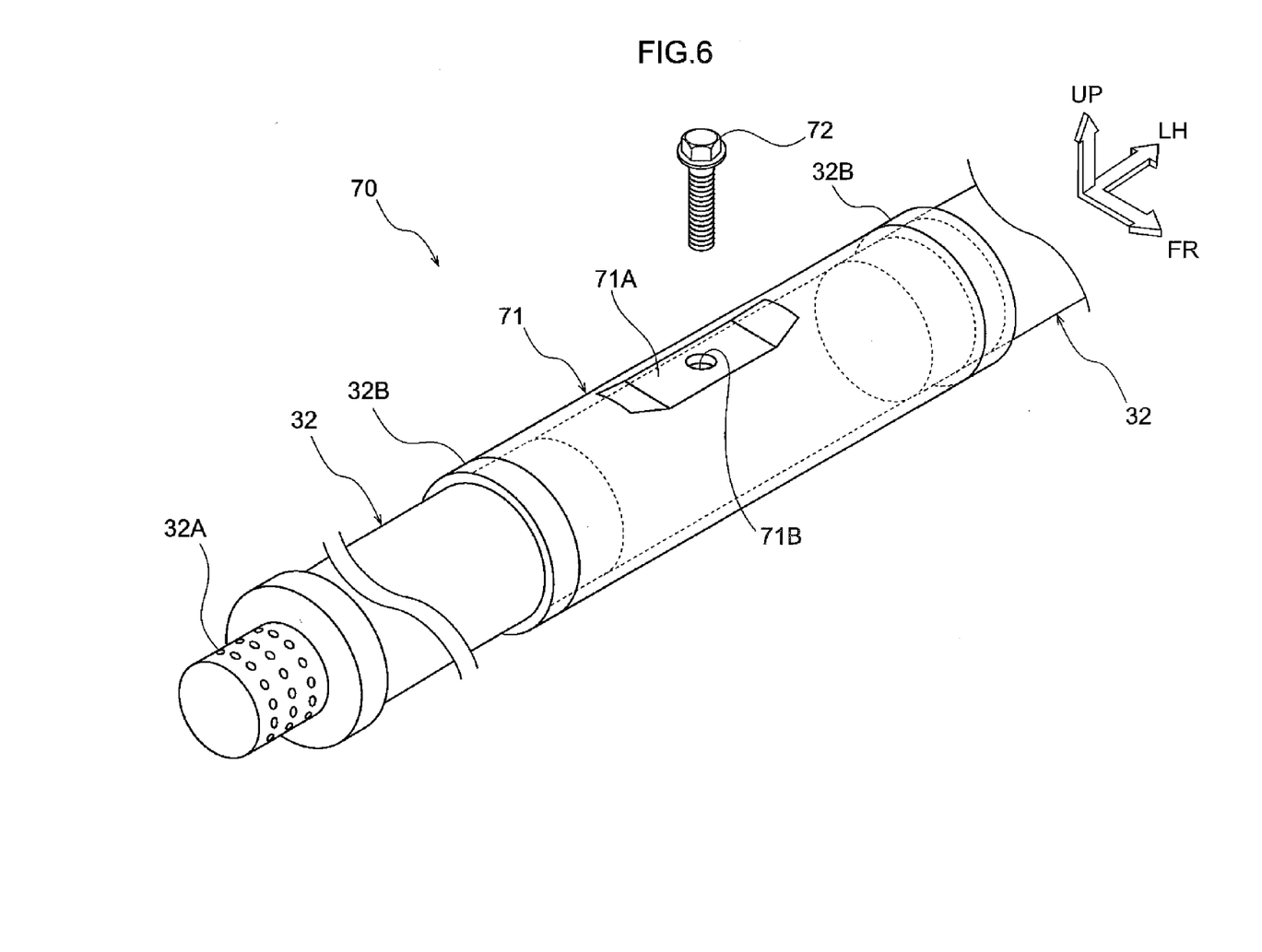
FIG. 6 is a perspective view showing a joining bracket that structures a pedestrian protection airbag device in accordance with a third exemplary embodiment.

As shown in FIG. 6, in the airbag device 70 according to the present exemplary embodiment, the pair of inflators 32 are accommodated in an airbag case that is not shown in the drawings. Each of the pair of inflators 32 extends in the vehicle width direction and is provided with the gas jetting-out portion 32A at the vehicle width direction outer side. Similarly to the first exemplary embodiment and the second exemplary embodiment, the pair of inflators 32 are arranged substantially in a straight line in the vehicle width direction in plan view (see FIG. 1).

A joining bracket 71 is disposed between the pair of inflators 32. The joining bracket 71 is accommodated in the vehicle width direction middle region of the airbag case that is not shown in the drawings. The joining bracket 71 is formed in a long, narrow shape whose length direction is along the vehicle width direction. The joining bracket 71 is formed in a substantially circular arc shape that is open to the vehicle lower side in a vertical cross section extending along the vehicle front-and-rear direction.

A recess portion 71A that is recessed relative to a general portion is formed at a vehicle width direction central portion of the joining bracket 71. An insertion hole 71B into which a bolt 72 is to be inserted is formed in the recess portion 71A. The bolt 72 is inserted into the insertion hole 71B and screwed into a nut, which is not shown in the drawings, from the lower side of the joining bracket 71. Thus, the bolt 72 may join the joining bracket 71 to the hood inner panel at the rear end portion of the hood.

The joining bracket 71 is formed in the circular arc shape with a slightly smaller diameter than the inflators 32. Vehicle width direction inner side end portions of the inflators 32 are fitted into the two vehicle width direction end portions of the joining bracket 71. Thus, the pair of inflators 32 are joined in the vehicle width direction by the joining bracket 71 and are mounted to the rear end portion of the hood via the joining bracket 71.

—Operation and Effects—

According to the airbag device 70 of the present exemplary embodiment, the same effects may be provided as in the second exemplary embodiment. In addition, because the joining bracket 71 is formed in the substantially circular arc shape, when the joining bracket 71 is being mounted to the hood, it is easy to screw the bolt 72 into the nut from the lower side. Therefore, ease of mounting operations may be improved.

In the present exemplary embodiment, the inflators 32 fit into the two vehicle width direction end portions of the joining bracket 71. However, this is not limiting and an alternative structure may be employed. For example, a structure is possible in which the inflators 32 and the joining bracket 71 are bound together by members such as bands made of metal or the like.

Hereabove, first to third exemplary embodiments of pedestrian protection airbag devices have been described. These exemplary embodiments may be used in combinations, and it will be clear that numerous modes may be embodied within a technical scope not departing from the spirit of the present disclosure. For example, in the exemplary embodiments described above as illustrated in FIG. 2 and FIG. 3, the airbag case 28 is disposed outside the engine compartment 16, but the present disclosure is not limited to this structure. For example, a structure may be formed in which the front end portion 48A of the cowl louver 48 is disposed below the airbag case 28, or a structure may be formed in which the airbag case 28 is supported by the cowl louver 48 via the weatherstripping 50.

The first exemplary embodiment and the second exemplary embodiment may be combined. In this case, the vehicle width direction outer sides of the inflators 32 are mounted to the hood 18 by the mounting brackets 34 shown in FIG. 3 and the vehicle width direction inner sides of the inflators 32 are mounted to the hood 18 by the joining bracket 61 shown in FIG. 5. Thus, mounting strength may be improved. The first exemplary embodiment and the third exemplary embodiment may be similarly combined.

In the exemplary embodiments described above, a structure is described in which the engine 100 is installed in the engine compartment 16, but the present disclosure is not limited to this structure. For example, the present disclosure is also applicable to a structure in which an electric motor is installed. The present disclosure is still further applicable to a structure in which an engine and an electric motor are installed.

In the exemplary embodiments described above, as illustrated in FIG. 4, structures are described in which the pop-up device 14 is provided, but this is not limiting. The present disclosure is applicable to a vehicle that is not equipped with a pop-up device. In this case, a structure is possible in which the rear end portion of the hood is raised by the inflation and expansion pressure of the airbag.

What is claimed is:

1. A pedestrian protection airbag device comprising:
an airbag case that is disposed in front of a wiper, both the airbag case and the wiper being disposed under a hood, with a length direction of the airbag case extending along a vehicle width direction, a middle region of the airbag case, when viewed in a vertical cross-section that extends in a vehicle front-and-rear direction, has a cross-sectional height in a vehicle up-and-down direction that is smaller than a cross-sectional height in the vehicle up-and-down direction of a general portion of the airbag case located at outer ends of the middle region of the airbag case, the airbag case being arranged in contact with and along a lower face of a bulge portion formed in a hood inner panel comprised of the hood, the bulge portion bulges to a vehicle lower side thereof and extends along the vehicle width direction;
a pair of inflators that are respectively accommodated at each of outer ends in the vehicle width direction of the middle region of the airbag case; and
an airbag that is folded and accommodated in the airbag case, the airbag inflating and expanding, due to pressure of gas generated by the inflators, to a vehicle rearward side through a gap between a hood rear end portion and a windshield glass.

2. The pedestrian protection airbag device according to claim 1, wherein the middle region of the airbag case has a length in the vehicle front-and-rear direction that is shorter than a length in the vehicle front-and-rear direction of the general portion.

3. The pedestrian protection airbag device according to claim 1, wherein the airbag case is disposed outside a power unit compartment of a vehicle in which the airbag case is disposed.

4. The pedestrian protection airbag device according to claim 3, wherein the airbag case is disposed at a vehicle upper side of a cowl louver of the vehicle, with a gap formed between the airbag case and the cowl louver.

5. The pedestrian protection airbag device according to claim 1, wherein the pair of inflators are joined to each other by a joining bracket disposed at the middle region of the airbag case, and the pair of inflators are mounted to the hood rear end portion via the joining bracket.

6. The pedestrian protection airbag device according to claim 5, wherein:
   the pair of inflators extend in the vehicle width direction and are provided with gas outlets at vehicle width direction outer side end portions of the inflators, and
   the pair of inflators are arranged in a straight line in the vehicle width direction in plan view.

7. The pedestrian protection airbag device according to claim 1, wherein the pair of inflators are arranged in a substantially straight line in the vehicle width direction in plan view.

8. The pedestrian protection airbag device according to claim 1, wherein the pair of inflators are disposed such that a central axis of a first one of the inflators crosses a central axis of a second one of the inflators.

9. A pedestrian protection airbag device comprising:
   an airbag case that is disposed in front of a wiper, both the airbag case and the wiper being disposed under a hood, a length direction of the airbag case extending in a vehicle width direction, the airbag case including, in the vehicle width direction, (i) a middle region, and (ii) first and second end portions located at outer ends in the vehicle width direction of the middle region of the airbag case, the airbag case being arranged in contact with and along a lower face of a bulge portion formed in a hood inner panel comprised of the hood, the bulge portion bulges to a vehicle lower side thereof and extends along the vehicle width direction;
   a pair of inflators that are respectively accommodated at each of the outer ends in the vehicle width direction of the middle region of the airbag case; and
   an airbag that is folded and accommodated in the airbag case, the airbag inflating and expanding, due to pressure of gas generated by the inflators, to a vehicle rearward side through a gap between a hood rear end portion and a windshield glass, wherein
   a height of the middle region in a vehicle up-and-down direction is smaller than heights of the first and second end portions in the vehicle up-and-down direction.

10. The pedestrian protection airbag device according to claim 9, wherein the middle region has a length in the vehicle front-and-rear direction that is shorter than lengths in the vehicle front-and-rear direction of the first and second end portions.

11. The pedestrian protection airbag device according to claim 9, wherein the pair of inflators are joined to each other by a joining bracket disposed at the middle region of the airbag case, and the pair of inflators are mounted to the hood rear end portion via the joining bracket.

12. The pedestrian protection airbag device according to claim 11, wherein:
   the pair of inflators extend in the vehicle width direction and are provided with gas outlets at vehicle width direction outer side end portions of the inflators, and
   the pair of inflators are arranged in a straight line in the vehicle width direction in plan view.

13. The pedestrian protection airbag device according to claim 9, wherein the pair of inflators are arranged in a substantially straight line in the vehicle width direction in plan view.

14. The pedestrian protection airbag device according to claim 9, wherein the pair of inflators are disposed such that a central axis of a first one of the inflators crosses a central axis of a second one of the inflators.

* * * * *